United States Patent
Greszler et al.

(10) Patent No.: US 9,368,816 B2
(45) Date of Patent: Jun. 14, 2016

(54) SHUTDOWN STRATEGY TO AVOID CARBON CORROSION DUE TO SLOW HYDROGEN/AIR INTRUSION RATES

(71) Applicant: GM Global Technology Operations LLC, Detroit, MI (US)

(72) Inventors: Thomas A. Greszler, Rochester, NY (US); Gary M. Robb, Honeoye Falls, NY (US); John P. Salvador, Penfield, NY (US); Balasubramanian Lakshmanan, Pittsford, NY (US); Hubert Gasteiger, Leghorn (IT)

(73) Assignee: GM Global Technology Operations LLC, Detroit, MI (US)

( * ) Notice: Subject to any disclaimer, the term of this patent is extended or adjusted under 35 U.S.C. 154(b) by 191 days.

(21) Appl. No.: 14/050,438

(22) Filed: Oct. 10, 2013

(65) Prior Publication Data

US 2014/0038073 A1 Feb. 6, 2014

Related U.S. Application Data

(62) Division of application No. 12/327,957, filed on Dec. 4, 2008, now Pat. No. 8,580,445.

(51) Int. Cl.
| | | |
|---|---|---|
| *H01M 8/06* | (2006.01) | |
| *H01M 8/18* | (2006.01) | |
| *H01M 2/38* | (2006.01) | |
| *H01M 8/04* | (2016.01) | |

(52) U.S. Cl.
CPC ...... *H01M 8/04223* (2013.01); *H01M 8/04097* (2013.01); *Y02E 60/50* (2013.01)

(58) Field of Classification Search
CPC ............. H01M 8/04097; H01M 8/04111; H01M 8/04201; H01M 8/04223; H01M 8/04231; H01M 8/04746; H01M 8/04753; H01M 8/04761; H01M 8/04104
USPC .......................................... 429/415, 417, 455
See application file for complete search history.

(56) References Cited

U.S. PATENT DOCUMENTS

| | | | |
|---|---|---|---|
| 2001/0028550 A1* | 10/2001 | Miyake et al. ............... 361/695 |
| 2003/0148167 A1* | 8/2003 | Sugawara et al. ............. 429/34 |
| 2004/0126628 A1* | 7/2004 | Balliet et al. .................. 429/13 |
| 2008/0026269 A1* | 1/2008 | Shurtleff et al. ................ 429/19 |

FOREIGN PATENT DOCUMENTS

CN 1864292 A 11/2006

* cited by examiner

*Primary Examiner* — Patrick Ryan
*Assistant Examiner* — Julian Anthony
(74) *Attorney, Agent, or Firm* — Fraser Clemens Martin & Miller LLC; James D. Miller

(57) ABSTRACT

A fuel cell system including a fuel cell stack having a plurality of fuel cells, each of the fuel cells including an electrolyte membrane disposed between an anode and a cathode, an anode supply manifold in fluid communication with the anodes of the fuel cells, the anode supply manifold providing fluid communication between a source of hydrogen and the anodes, an anode exhaust manifold in fluid communication with the anodes of the fuel cells, and a fan in fluid communication with the anodes of the fuel cells, wherein the fan controls a flow of fluid through the anodes of the fuel cells after the fuel cell system is shutdown.

19 Claims, 4 Drawing Sheets

SHUTDOWN STRATEGY TO AVOID CARBON CORROSION DUE TO SLOW HYDROGEN/AIR INTRUSION RATES

CROSS-REFERENCE TO RELATED APPLICATIONS

This application is a divisional of U.S. patent application Ser. No. 12/327,957 filed on Dec. 4, 2008. The entire disclosure of the above application is hereby incorporated herein by reference.

FIELD OF THE INVENTION

The invention relates to hydrogen fuel cells. More particularly, the invention is directed to a fuel cell system and a method for minimizing carbon corrosion in the fuel cell system.

BACKGROUND OF THE INVENTION

A fuel cell has been proposed as a clean, efficient and environmentally responsible power source for electric vehicles and various other applications. In particular, the fuel cell has been identified as a potential alternative for a traditional internal-combustion engine used in modern vehicles.

A typical fuel cell is known as a proton exchange membrane (PEM) fuel cell. The PEM fuel cell includes three basic components: a cathode, an anode and an electrolyte membrane. The cathode and anode typically include a finely divided catalyst, such as platinum, supported on carbon particles and mixed with an ionomer. The electrolyte membrane is sandwiched between the cathode and the anode to form a membrane-electrolyte-assembly (MEA). The MEA is often disposed between porous diffusion media (DM) which facilitate a delivery of gaseous reactants, typically hydrogen and oxygen from air, for an electrochemical fuel cell reaction. Individual fuel cells can be stacked together in series to form a fuel cell stack. The fuel cell stack is capable of generating a quantity of electricity sufficient to power a vehicle.

During periods of non-operation, a quantity of air accumulates in the anodes of the fuel cell stack. Upon start-up of the fuel cell stack, hydrogen is supplied to the anodes. The hydrogen contacts the air and creates a "hydrogen-air front" that passes over the anodes. The hydrogen-air front is known to degrade fuel cell performance. In particular, the presence of both hydrogen and air on the anode results in a localized short between a portion of the anode that sees hydrogen and a portion of the anode that sees air. The localized short causes a reversal of current flow and increases the cathode interfacial potential, resulting in a rapid corrosion of the fuel cell carbon substrates and catalyst supports. The rate of carbon corrosion has been found to be proportional to a time that the hydrogen-air front exists and a magnitude of the localized voltage at the hydrogen-air front.

To avoid damage to the fuel cell system, the fuel cell system can be shutdown using a hydrogen-hydrogen shutdown strategy, wherein hydrogen is present on both electrodes (anode and cathode) after the shutdown procedure is complete. If the fuel cell system is restarted before air leaks into the cathode no damaging carbon corrosion will occur. However, if air leaks into the cathode while hydrogen is still present, a stagnant hydrogen-air front can form on the anode which will cause carbon corrosion on the cathode electrode.

Additionally, a freeze event may occur while the anode compartment is full of stagnant gas (hydrogen, air, water vapor in some combination). As the temperature drops, the stagnant gas begins to condense throughout the anode compartment. Unfortunately, the gas may condense on valves and other critical moving parts, and then freeze. The frozen condensation can render the valve (or other critical component) inoperative during startup, thereby leading to increased damage to cells upon startup and/or a failed freeze start.

It would be desirable to provide a fuel cell system and a method for minimizing carbon corrosion in the fuel cell system, wherein the system and the method maximize the durability of the fuel cell system while not sacrificing a hydrogen-hydrogen shutdown strategy.

SUMMARY OF THE INVENTION

Concordant and consistent with the present invention, a fuel cell system and a method for minimizing carbon corrosion in the fuel cell system, wherein the system and the method maximize the durability of the fuel cell system while not sacrificing a hydrogen-hydrogen shutdown strategy, has surprisingly been discovered.

In one embodiment, a fuel cell system includes: a fuel cell stack having a plurality of fuel cells, each of the fuel cells including an electrolyte membrane disposed between an anode and a cathode; an anode supply manifold in fluid communication with the anodes of the fuel cells, the anode supply manifold providing fluid communication between a source of hydrogen and the anodes; an anode exhaust manifold in fluid communication with the anodes of the fuel cells; and a fan in fluid communication with the anodes of the fuel cells, wherein the fan controls a flow of fluid through the anodes of the fuel cells after the fuel cell system is shutdown.

The invention also provides methods for minimizing carbon corrosion in a fuel cell system.

One method comprises the steps of: providing a fuel cell stack having a plurality of fuel cells, each of the fuel cells including an electrolyte membrane disposed between an anode and a cathode; providing an anode supply manifold and an anode exhaust manifold in fluid communication with the anodes of the fuel cells, wherein the anode supply manifold has a fluid disposed therein and in fluid communication with a source of hydrogen gas; performing a shutdown procedure, wherein hydrogen gas is present in the anodes and the cathodes after the shutdown procedure is complete; and generating a flow across the anodes of the fuel cell stack after the shutdown procedure is complete.

Another method comprises the steps of: providing a fuel cell stack having a plurality of fuel cells, each of the fuel cells including an electrolyte membrane disposed between an anode and a cathode; providing an anode supply manifold and an anode exhaust manifold in fluid communication with the anodes of the fuel cells, wherein the anode supply manifold has a fluid disposed therein and in fluid communication with a source of hydrogen gas; performing a shutdown procedure, wherein hydrogen gas is present in the anodes and the cathodes after shutdown; and providing a fan in fluid communication with the anodes of the fuel cells for generating a flow across the anodes after shutdown.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
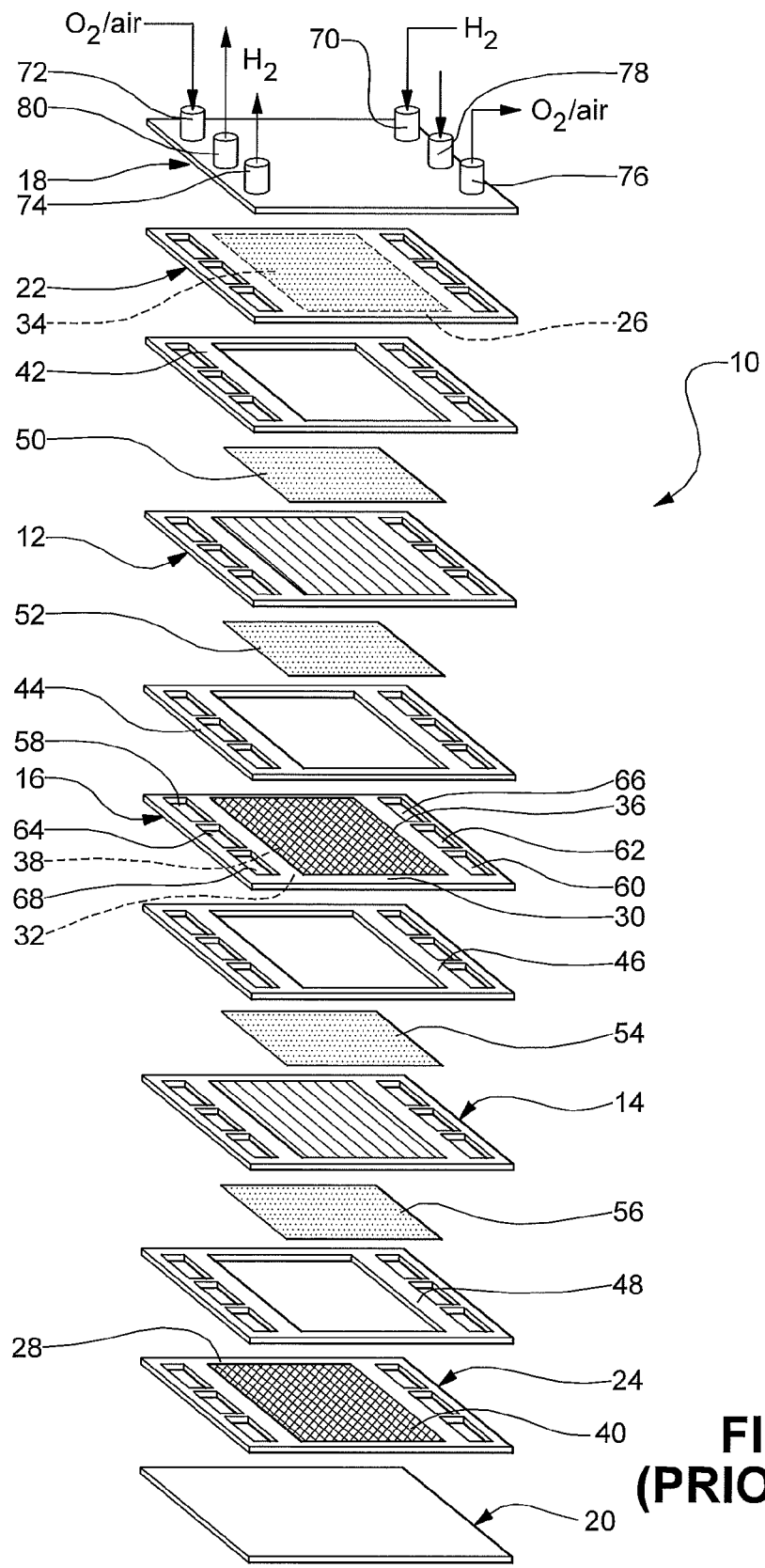
FIG. 1 is a schematic exploded perspective view of a PEM fuel cell stack as known in the art.

For simplicity, only a two-cell stack (i.e. one bipolar plate) is illustrated and described in FIG. 1, it being understood that a typical fuel cell stack will have many more such cells and bipolar plates.

FIG. 1 illustrates a PEM fuel cell stack 10 according to the prior art. The fuel cell stack 10 includes a pair of membrane electrode assemblies (MEAs) 12, 14 separated by an electrically conductive bipolar plate 16. The MEAs 12, 14 and the bipolar plate 16 are stacked between a pair of clamping plates 18, 20 and a pair of unipolar end plates 22, 24. The clamping plates 18, 20 are electrically insulated from the end plates 22, 24 by a gasket or a dielectric coating (not shown). A working face 26, 28 of each of the unipolar end plates 22, 24, as well as the working faces 30, 32 of the bipolar plate 16, include a plurality of grooves or channels 34, 36, 38, 40 adapted to facilitate the flow of a fuel such as hydrogen and an oxidant such as oxygen therethrough. Nonconductive gaskets 42, 44, 46, 48 provide seals and an electrical insulation between the components of the fuel cell stack 10. Gas-permeable diffusion media 50, 52, 54, 56 such as carbon or graphite diffusion papers substantially abut each of an anode face and a cathode face of the MEAs 12, 14. The end plates 22, 24 are disposed adjacent the diffusion media 50, 56 respectively. The bipolar plate 16 is disposed adjacent to the diffusion media 52 on the anode face of the MEA 12. The bipolar plate 16 is further disposed adjacent the diffusion media 54 on the cathode face of the MEA 14.

The fuel cell stack 10 further includes a cathode supply manifold 58 and a cathode exhaust manifold 60, a coolant supply manifold 62, a coolant exhaust manifold 64, an anode supply manifold 66, and an anode exhaust manifold 68. The supply manifolds 58, 62, 66 and the exhaust manifolds 60, 64, 68 are formed by alignment of adjacent apertures formed in the bipolar plate 16, apertures formed in the gaskets 42, 44, 46, 48, and apertures formed in the end plates 22, 24. A hydrogen gas is supplied to the fuel cell stack 10 through the anode supply manifold 66 via an anode inlet conduit 70. An oxidant gas is supplied to the fuel cell stack 10 through the cathode supply manifold 58 of the fuel cell stack 10 via a cathode inlet conduit 72. An anode outlet conduit 74 and a cathode outlet conduit 76 are provided for the anode exhaust manifold 68 and the cathode exhaust manifold 60, respectively. A coolant inlet conduit 78 and a coolant outlet conduit 80 are in fluid communication with the coolant supply manifold 62 and the coolant exhaust manifold 64 to provide a flow of a liquid coolant there through. It is understood that the configurations of the various inlets 70, 72, 78 and outlets 74, 76, 80 in FIG. 1 are for the purpose of illustration, and other configurations may be chosen as desired.

Figure 2:
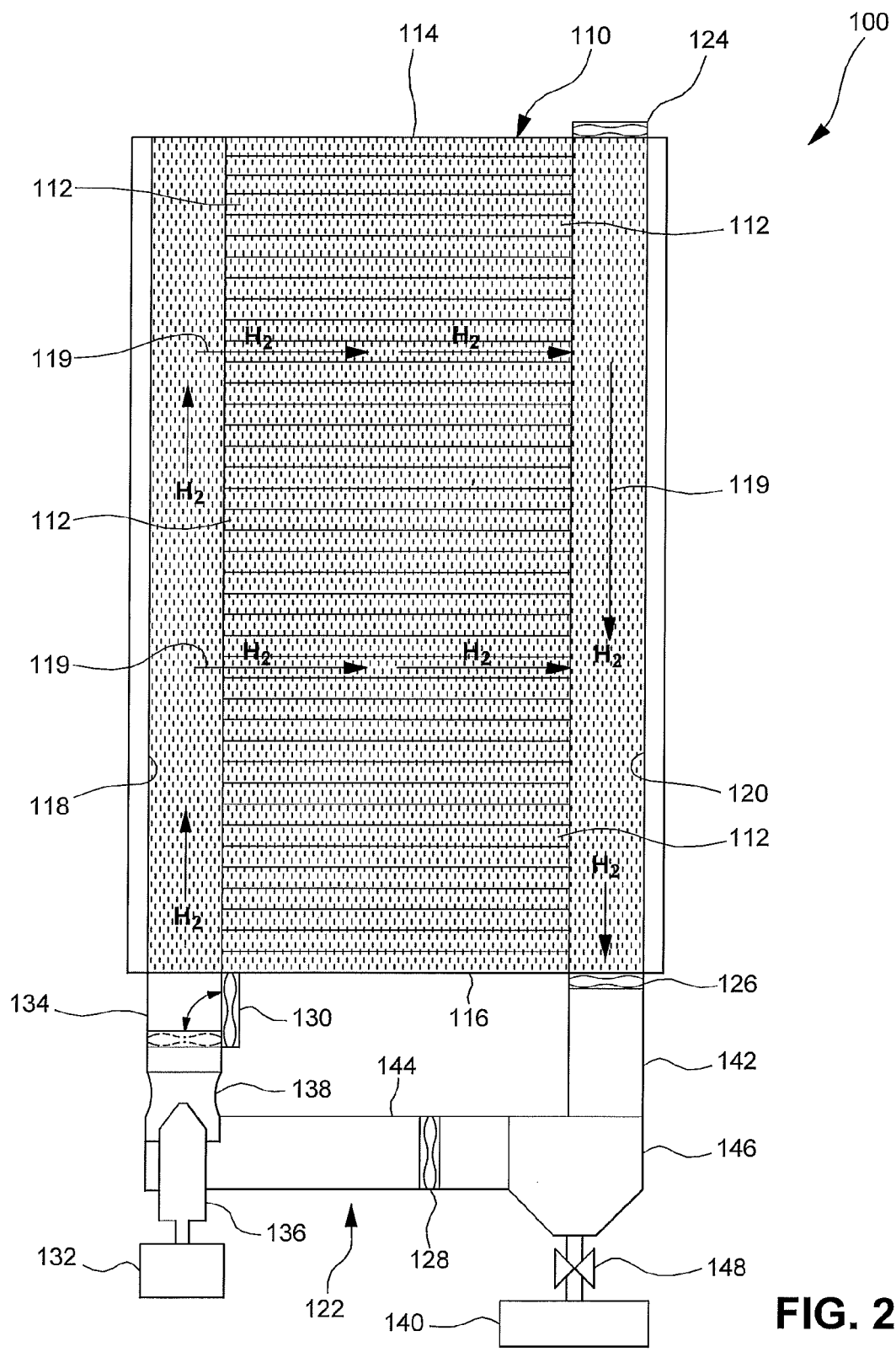
FIG. 2 is a schematic cross-sectional view of a fuel cell system immediately after a hydrogen-hydrogen shutdown procedure.
Figure 3:
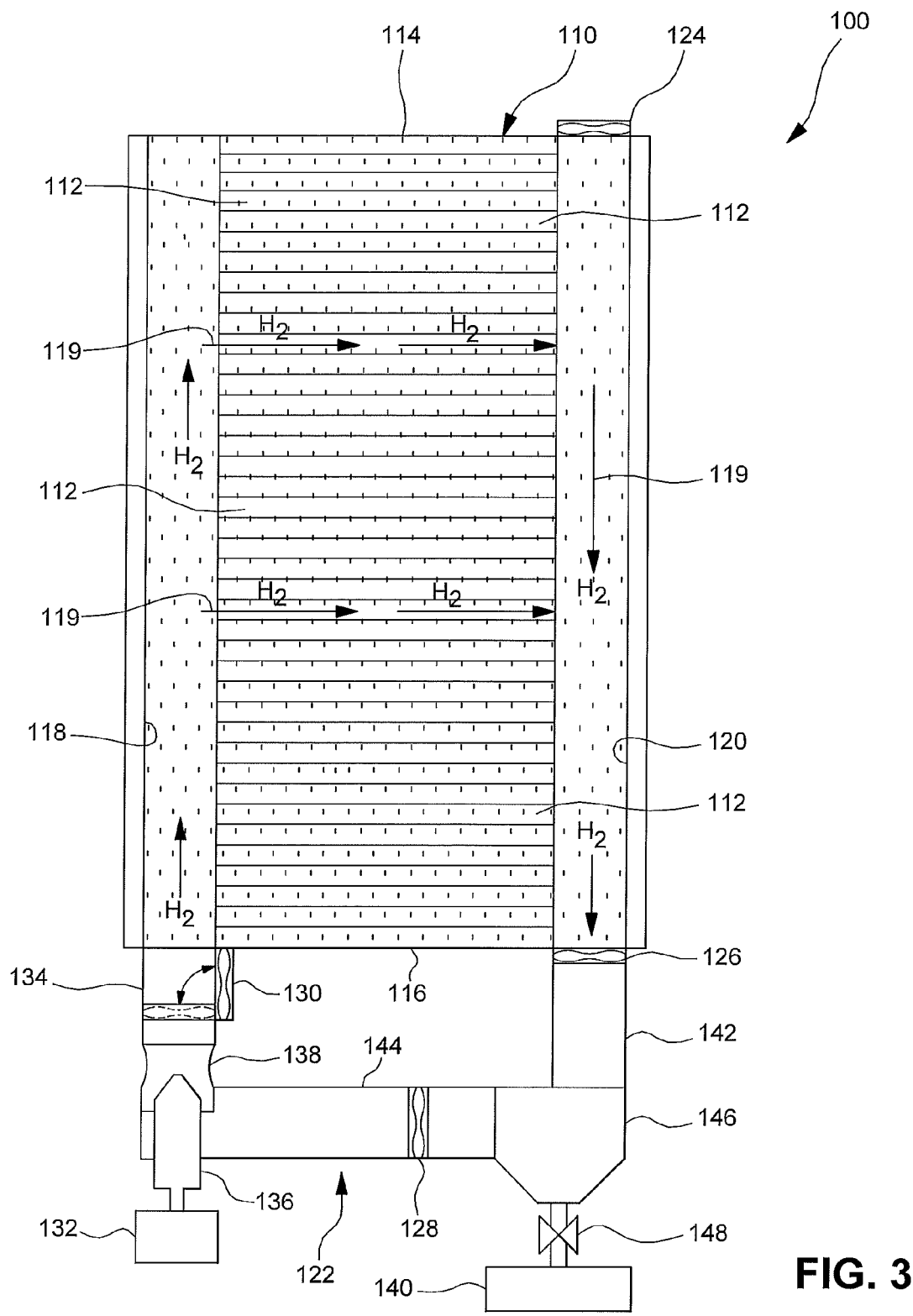
FIG. 3 is a schematic cross-sectional view of the fuel cell system of FIG. 2 showing a decrease in hydrogen concentration as air leaks into the fuel cell system.
Figure 4:
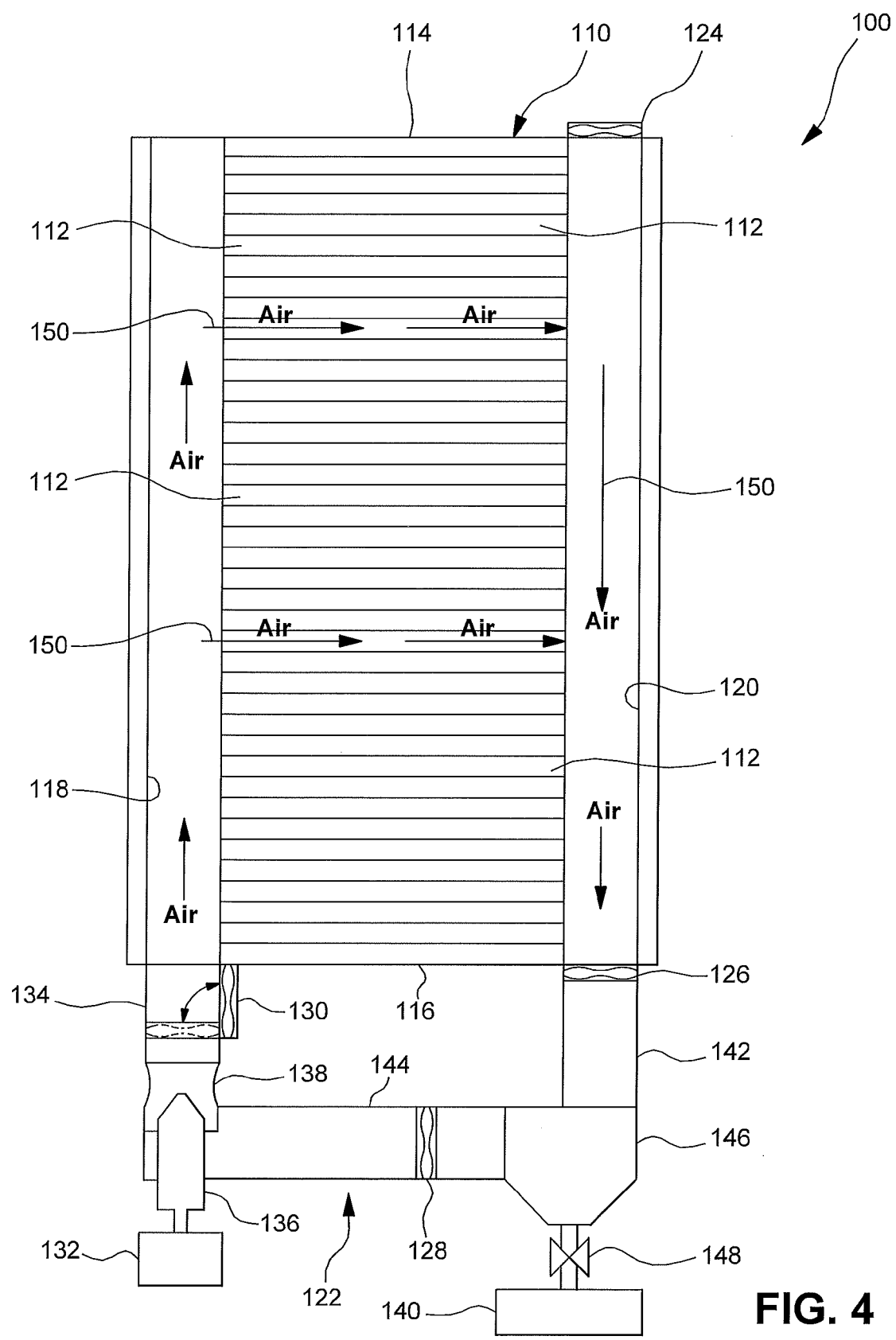
FIG. 4 is a schematic cross-sectional view of the fuel cell system of FIG. 2 after air has filled an anode side of the fuel cell system.

FIGS. 2, 3 and 4 show an anode side of a fuel cell system 100 according to an embodiment of the invention. The fuel cell system 100 includes a fuel cell stack 110 having a plurality of fuel cells 112. Each of the fuel cells 112 has an anode (not shown) and a cathode (not shown) with an electrolyte membrane (not shown) disposed therebetween. The fuel cell stack 110 further includes a first end 114 and a second end 116. As described herein, the first end 114 is known as the "dry end" and the second end 116 is known as the "wet end."

In the embodiment shown, the fuel cell system 100 further includes an anode supply manifold 118, an anode exhaust manifold 120, a recycle loop 122, and a plurality of fans 124, 126, 128, 130. It is understood that additional components and systems may be included in the fuel cell system 100, as desired.

The anode supply manifold 118 is in fluid communication with the anodes of the fuel cells 112 and provides fluid communication between a source of hydrogen 132 and the fuel cells 112. The anode supply manifold 118 receives a flow of gaseous hydrogen 119 through an anode inlet conduit 134 from the source of hydrogen 132. The anode inlet conduit 134 defines a volume between the source of hydrogen 132 and the anode supply manifold 118. It is understood that the anode inlet conduit 134 may have any desired cross-sectional area and may further include a chamber, for example.

The fuel cell system 100 further includes a fuel injector 136 and a jet pump 138 disposed between the source of hydrogen 132 and the anode inlet conduit 134. The injector 136 and the jet pump 138 provide control over the flow of hydrogen 119 into the anode inlet conduit 134. It is understood that additional components may be in communication with the source of hydrogen 132 and the anode inlet conduit 134 such as a pressure regulator and recirculation pump, for example. Other components or system may be in communication with the anode inlet conduit 134, as desired.

An anode exhaust manifold 120 of the fuel cell system 100 provides fluid communication between the anodes of the fuel cells 112, and an exhaust system 140 and the recycle loop 122. The anode exhaust manifold 120 receives a fluid flowing through the anodes of the fuel cells 112. As a non-limiting example, the fluid caused to flow through the anodes may be gaseous hydrogen, air, or water. Other fluids may be used, as desired. In the embodiment shown, the fuel cell system 100 includes an anode exhaust conduit 142 in fluid communication with the anode exhaust manifold 120. The anode exhaust conduit 142 defines a volume between the anode exhaust manifold 120 and at least one of the exhaust system 140 and the recycle loop 122. It is understood that the anode exhaust conduit 142 may have any desired cross-sectional area and may further include a chamber, for example.

The recycle loop 122 provides fluid communication between the anode exhaust manifold 120 and the anode supply manifold 118. In certain embodiments, the recycle loop 112 includes at least a portion of the anode inlet conduit 134, at least a portion of the anode exhaust conduit 142, a recycle conduit 144, a water separator 146, and first valve 148. However, it is understood that other components may be included, as desired.

The recycle conduit 144 defines a volume between the anode inlet conduit 134 and the anode exhaust conduit 142. It is understood that the recycle conduit 144 may have any desired cross-sectional area and may further include a chamber, for example. In the embodiment shown, the recycle conduit 144 is in fluid communication with the water separator 146 and the jet pump 138. It is understood that the recycle conduit 144 may be in direct communication with at least one of the anode inlet conduit 134, the anode supply manifold 118, the anode exhaust manifold 120, and the anode exhaust conduit 142. It is further understood that other components or systems may be disposed between the recycle conduit 144 and at least one of the anode inlet conduit 134, the anode supply manifold 118, the anode exhaust manifold 120, and the anode exhaust conduit 142, as desired.

The water separator 146 is disposed between the anode exhaust conduit 142 and the recycle conduit 144 and is adapted to remove excess humidification or product water from the fluid received from the anode exhaust conduit 142. The water separator 146 is in further fluid communication with the first valve 148. The first valve 148 is adapted to drain or bleed the product water collected in the water separator 146. As shown, the first valve 148 is in further fluid communication with the exhaust system 140 and is adapted to drain the product water into the exhaust system 140. However, it is understood that the first valve 148 may be adapted to drain the product water into any system or device, as desired. It is further understood that additional valves and control devices may be included, as desired.

The fans 124, 126, 128, 130 may be any devices adapted to provide a flow across the anode electrodes throughout the fuel cell stack 110. In the embodiment shown, the fuel cell system 100 includes four fans 124, 126, 128, 130. However, it is understand that any number of fans may be used, as desired. It is further understood that any of the characteristics and specifications of the fans 124, 126, 128, 130 may be modified, as desired. In certain embodiments, the fans 124, 126, 128, 130 are low power fans having a power range of 1-500 Watts. However, other power ranges may be used. For example, favorable results have been achieved using fans having a power range of 10-50 Watts. The fans 124, 126, 128, 130 may be in electrical communication with a dedicated electrical power system (not shown) and/or an electrical system of the fuel cell system 100 or vehicle. As shown, the first fan 124 is disposed adjacent the anode exhaust manifold 120 and in fluid communication with the anode exhaust manifold 120 to provide a flow in the anode exhaust manifold 120. The second fan 126 is disposed in the anode exhaust conduit 142 and in fluid communication with the anode exhaust manifold 120 to provide a flow in the anode exhaust manifold 120. The third fan 128 is disposed in the recycle conduit 144 and adapted to provide a flow through the recycle loop 122. The fourth fan 130 is disposed in the anode inlet conduit 134 and hingedly coupled to the anode inlet conduit 134. The fourth fan 130 is positioned in the fluid flow path of the anode inlet conduit 134 and adapted to provide a flow through the anode inlet conduit 134 and thereby the anode supply manifold 118. Where the fourth fan 130 is not in use, the fourth fan 130 may be selectively rotated out of the fluid flow path of the anode inlet conduit 134, as shown in FIGS. 2-4. It is understood that the fans 124, 126, 128, 130 or a single fan may be disposed in any location, as desired. It is further understood that any combination of fans 124, 126, 128, 130 and fan locations may be used, as desired.

In use, the fuel cell system 100 is shutdown such that hydrogen 119 is present on both the anodes and the cathodes after the shutdown procedure is complete. It is understood that any shutdown procedure, now known or later developed, may be used, wherein hydrogen 119 remains in both the anodes and the cathodes after the shutdown procedure is complete. As a non-limiting example, at system shutdown, the cathode airflow is stopped and the cathode side of the fuel cell stack 110 is sealed. The flow of hydrogen 119 to the anode side of the fuel cell stack 110 is continued so that any remaining oxygen in the stack is consumed. The anode side of the fuel cell stack 110 is sealed so that the flow of hydrogen 119 is only to replace hydrogen that has been pumped to the cathode side of the fuel cell stack 110, thereby filling both the anode side and the cathode side of the fuel cells tack with hydrogen. As shown in FIG. 2, the anode supply manifold 118, the anode exhaust manifold 120 and the fuel cells 112 of the fuel cell stack 110 have a substantially uniform concentration of hydrogen 119 immediately after the shutdown procedure is complete. Over time, air 150 leaks into the cathodes of the fuel cell stack 110 and diffuses or leaks through the membrane or the gaskets into specific regions of the anodes. It is understood that air 150 may also leak directly into specific regions of the anodes. Meanwhile, the fans 124, 126, 128, 130 generate a flow to mix the air 150 and the hydrogen 119 in the anodes, thereby maintaining a substantially uniform hydrogen concentration between the anode supply manifold 118, the anode exhaust manifold 120, and the fuel cells 112. In certain embodiments, the fans 124, 126, 128, 130 have an intermittent duty cycle such as 30 seconds on and 30 seconds off, for example. However, it is understood that fans 124, 126, 128, 130 may be driven continuously or with any duty cycle, as desired. As such, the mixing of the air 150 and the hydrogen 119 in the fuel cells 112 minimizes the possibility of forming a hydrogen-air front in anode side of the fuel cell system 100. As shown in FIG. 3, the hydrogen concentration in the anode supply manifold 118, the anode exhaust manifold 120 and the fuel cells 112 of the fuel cell stack 110 is reduced relative to the hydrogen concentration immediately after the shutdown procedure. As shown in FIG. 4, the fans 124, 126, 128, 130 continue to mix the fluid stream in the fuel cells 112 as the air 150 continues to slowly leak in from the cathodes and the fuel cell stack 110 is returned to an environment wherein air 150 is present on the cathodes and the anodes (i.e. air-air environment) of the fuel cell stack 110 without significant cathode damage. As a non-limiting example, the fans 124, 126, 128, 130 may also provide a fluid flow across a "cold finger". A "cold finger" is a thermally conductive element in communication with ambient temperature conditions (outside the insulation and/or enclosure) such that the "cold finger" element is colder in a freeze situation than any other part of the fuel cell stack 110. As such, water vapor will condense first on the "cold finger" which is designed to allow condensed water to drain and/or freeze away from critical moving parts. The fans 124, 126, 128, 130 may be driven until the temperature throughout the fuel cell stack 110 is less than freezing, while the "cold finger" element continues to condense and drain the water vapor. Eventually the gas is quite dry and no water condenses on the critical moving parts.

The fuel cell system 100 and the method for minimizing carbon corrosion in the fuel cell system 100 provide a means to return the fuel cell system 100 to an air-air environment. Accordingly, the fuel cell system 100 and the method maximize the durability of the fuel cell system 100 while not sacrificing a hydrogen-hydrogen shutdown strategy. Further, the fuel cell system 100 and method can assist with freeze start/durability by allowing water to be condensed (and then frozen) in a specific location.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A fuel cell system comprising:
    a fuel cell stack having a plurality of fuel cells, each of the fuel cells including an electrolyte membrane disposed between an anode and a cathode;
    an anode supply manifold in fluid communication with the anodes of the fuel cells, the anode supply manifold providing fluid communication between a source of hydrogen and the anodes;
    an anode inlet conduit providing fluid communication between the source of hydrogen and the anode supply manifold;
    an anode exhaust manifold in fluid communication with the anodes of the fuel cells and an anode exhaust conduit;
    a recycle loop fluidly coupling the anode supply manifold and the anode exhaust manifold; and
    a fan in fluid communication with the anodes of the fuel cells, the fan hingedly coupled to the anode inlet conduit, wherein the fan controls a flow of fluid through the anode supply manifold, through the anodes of the fuel cells, through the exhaust manifold, and back to the anode supply manifold through the recycle loop while the fuel cell system is shutdown.

2. The fuel cell system according to claim 1, wherein the fan has a power range of 1-500 Watts.

3. The fuel cell system according to claim 1, further comprising at least one of a jet pump in fluid communication with the anode supply manifold, an injector in fluid communication with the anode supply manifold, and an anode exhaust conduit in fluid communication with the anode exhaust manifold.

4. The fuel cell system according to claim 1, wherein the recycle loop includes at least one of a water separator and a valve.

5. The fuel cell system according to claim 1, wherein the fan is adjustable between a first position wherein the fan is arranged parallel to the anode inlet conduit and a second position wherein the fan is arranged perpendicular to the anode inlet conduit.

6. A fuel cell system for minimizing carbon corrosion in the system, comprising:
    a fuel cell stack having a plurality of fuels cells, each of the fuel cells including an electrolyte membrane disposed between an anode and a cathode;
    an anode supply manifold and an anode exhaust manifold in fluid communication with the anodes of the fuel cells, wherein the anode supply manifold is in fluid communication with a source of hydrogen gas;
    an anode exhaust conduit disposed at a first end of the anode exhaust manifold and in fluid communication with the anode exhaust manifold;
    a recycle loop fluidly coupling the anode supply manifold and the anode exhaust manifold; and
    a first fan in fluid communication with the anodes of the fuel cells, the first fan disposed at a second end of the anode exhaust manifold formed opposite the anode exhaust conduit, wherein the first fan is configured to generate a flow through the anode supply manifold, across the anodes of the fuel cell stack, through the anode exhaust manifold, and back to the anode supply manifold through the recycle loop after a shutdown procedure to maintain a substantially uniform hydrogen gas concentration between the anode supply manifold, the anode exhaust manifold, and the fuel cells.

7. The fuel cell system according to claim 6, further comprising:
    an anode inlet conduit adapted to provide fluid communication between the anode supply manifold and the source of hydrogen.

8. The fuel cell system according to claim 7, further comprising a second fan disposed in the anode exhaust conduit to provide a flow in the anode exhaust manifold.

9. The fuel cell system according to claim 8, further comprising a third fan disposed in the anode inlet conduit to provide a flow through the anode supply manifold.

10. The fuel cell system according to claim 9, wherein the third fan is hingedly coupled to the anode inlet conduit.

11. The fuel cell system according to claim 9, further comprising a fourth fan disposed in the recycle loop to provide a flow therethrough.

12. The fuel cell system according to claim 11, wherein the recycle loop includes at least one of a water separator and a valve.

13. The fuel cell system of claim 6, further comprising:
    at least one jet pump in fluid communication with the anode supply manifold; and
    an injector in fluid communication with the anode supply manifold; and
    wherein the recycle loop includes a recycle conduit in fluid communication with the anode exhaust manifold.

14. A fuel cell system for minimizing carbon corrosion in the system, comprising:
    a fuel cell stack having a plurality of fuels cells, each of the fuel cells including an electrolyte membrane disposed between an anode and a cathode;
    an anode supply manifold and an anode exhaust manifold in fluid communication with the anodes of the fuel cells, wherein the anode supply manifold is in fluid communication with a source of hydrogen gas;
    a recycle loop including a recycle conduit fluidly coupling the anode supply manifold and the anode exhaust manifold;
    an anode inlet conduit adapted to provide fluid communication between the anode supply manifold and the source of hydrogen;
    an anode exhaust conduit disposed at a first end of the anode exhaust manifold and in fluid communication with the anode exhaust manifold;
    at least one jet pump in fluid communication with the anode supply manifold;
    an injector in fluid communication with the anode supply manifold;
    and
    a first fan in fluid communication with the anodes of the fuel cells, the first fan disposed at a second end of the anode exhaust manifold formed opposite the anode exhaust conduit, wherein the first fan is configured to generate a flow through the anode supply manifold, across the anodes of the fuel cell stack, through the anode exhaust manifold, and back to the anode supply manifold through the recycle loop after a shutdown procedure to maintain a substantially uniform hydrogen gas concentration between the anode supply manifold, the anode exhaust manifold, and the fuel cells.

15. The fuel cell system according to claim 14, further comprising a second fan disposed in the anode exhaust conduit to provide a flow in the anode exhaust manifold.

16. The fuel cell system according to claim 15, further comprising a third fan disposed in the recycle conduit to provide a flow through the recycle loop.

17. The fuel cell system according to claim 16, further comprising a fourth fan disposed in the anode inlet conduit to provide a flow through the anode supply manifold.

18. The fuel cell system according to claim 16, wherein the third fan is hingedly coupled to the anode inlet conduit.

19. The fuel cell system according to claim 14, wherein the recycle loop includes a water separator.

\* \* \* \* \*